(12) United States Patent
Aiello et al.

(10) Patent No.: US 6,734,646 B2
(45) Date of Patent: May 11, 2004

(54) DRIVING CIRCUIT FOR ELECTRONICALLY SWITCHED MOTORS

(75) Inventors: Natale Aiello, Trecastagni (IT); Matteo Lo Presti, Misterbianco (IT); Alfio Consoli, Catania (IT); Francesco Gennaro, S. Agata Li Battiati (IT); Antonio Testa, Acireale (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/005,385

(22) Filed: Dec. 4, 2001

(65) Prior Publication Data

US 2002/0089303 A1 Jul. 11, 2002

(30) Foreign Application Priority Data

Dec. 4, 2000 (IT) ..................... MI2000A2611

(51) Int. Cl.[7] .................................................. H02P 7/05
(52) U.S. Cl. ...................................... 318/254; 318/701
(58) Field of Search ............................... 318/138, 254, 318/439, 700, 701, 720, 721, 722, 723, 724

(56) References Cited

U.S. PATENT DOCUMENTS

| | | | | |
|---|---|---|---|---|
| 4,684,867 A | * | 8/1987 | Miller et al. | ............... 318/701 |
| 5,115,181 A | * | 5/1992 | Sood | ........................ 318/701 |
| 5,424,624 A | * | 6/1995 | Senak, Jr. | ................... 318/701 |
| 5,576,943 A | * | 11/1996 | Keir | ............................ 363/56 |
| 5,689,164 A | * | 11/1997 | Hoft et al. | .................. 318/701 |
| 6,014,001 A | * | 1/2000 | Guinet | ....................... 318/701 |

* cited by examiner

Primary Examiner—Bentsu Ro
(74) Attorney, Agent, or Firm—Lisa K. Jorgenson; Stephen Bongini; Fleit, Kain, Gibbons, Gutman, Bongini & Bianco P.L.

(57) ABSTRACT

A driving circuit for electronically switched motors is provided. The driving circuit includes a supply voltage rectifying stage for providing a rectified supply voltage, first switching means for switching state based on output of a first control block, magnetic means for providing a magnetic flux according to the state of the first switching means, transmission diodes for transmitting an exciting current that flows through the magnetic means, first energy storing means for storing the exciting current, an energy return stage for transferring the energy stored in the first energy storing means to the rectifying stage, and energetic conversion means for receiving the energy stored in the energy storing means through second switching means controlled by a second control block, so as to provide a current as sinusoidal as possible.

23 Claims, 2 Drawing Sheets

DRIVING CIRCUIT FOR ELECTRONICALLY SWITCHED MOTORS

CROSS-REFERENCE TO RELATED APPLICATIONS

This application is based upon and claims priority from prior Italian Patent Application No. MI2000A002611, filed Dec. 4, 2000, the entire disclosure of which is herein incorporated by reference.

BACKGROUND OF THE INVENTION

1. Field of the Invention

The present invention relates to a driving circuit for electronically switched motors, particularly for brushless DC motors and switched reluctance motors.

2. Description of Related Art

In a conventional electronically switched motor, phase windings or poles are present on the stator but there are not windings on the rotor.

It is known that in a motor a magnetic attraction/repulsion force is generated between the rotor and the stator poles, when they approach themselves.

In this way current pulses, synchronized with the rotor revolution, can be provided by a driving circuit that makes full use of a current or voltage switching device, placed in series with each phase, as for example a thyristor or a transistor.

Every time the phase of an electronically switched motor is switched by the turning on of a transistor, in the driving circuit the current flows in the windings of a stator coming from a DC supply. A part of this energy is converted into mechanical energy causing the rotation of the rotor. Another part of the energy is stored in a magnetic field that is lost.

A typology of motor driving converters for recovering the lost energy is that known as C-dump, thanks to which some drawbacks, present in the unipolar converters for electronically controlled motors, such as the top sustainable power (at the maximum P=100 W) and the need for a double supply for application at high rotation velocity, have been overcome.

However the present C-dump converters have still some drawbacks such as the need for having drivers connected in high side configuration so as to control the switching of the switch dump and the need for including a passive or active filter so as to have the possibility of increasing the power factor.

The drivers connected in high side configuration require for their working either an isolated power supply or a charge pump circuit. This increases the cost and the complexity preventing the integration in a single chip.

In fact, particularly for this last aspect, that is for the correction of the power factor, usually a power active converter PFC (Power Factor Correction) is used.

However, proceeding in this way further semiconductor power devices and passive circuit elements are introduced which bring an increase in the manufacturing costs of the driving system.

One conventional technique for the manufacturing of a converter for electronically switched motors is shown in U.S. Pat. No. 6,014,001, in which some switches or high voltage drives placed in high side configuration are used.

SUMMARY OF THE INVENTION

In view of these drawbacks, it is an object of the present invention to overcome the above-mentioned drawbacks and to provide a driving circuit that is able to increase the performance of electronically controlled motors and to reduce the complexity and the costs of the driving circuit thereof.

According to preferred embodiments of the present invention, there is provided a driving circuit for electronically switched motors that includes a supply voltage rectifying stage, adapted to provide a rectified supply voltage, first switching means adapted to change their condition at the receiving of a predetermined electrical signal provided by a first control block, magnetic means adapted to provide a magnetic flux according to the condition of the first switching means, a plurality of transmission diodes, adapted to transmit an exciting current that flows through the magnetic means in first energy storing means adapted to store the exciting current flowing through the plurality of diodes, an energy return stage adapted to transfer the stored energy in the first energy storing means to the rectifying stage, and energetic conversion means adapted to receive the energy stored in the energy storing means through second switching means controlled by a predetermined electrical signal provided by a second control block, so as to provide a current as sinusoidal as possible.

Another object of the present invention is to make it easier to make a converter.

A further object of the present invention is to make it possible to integrate the power transistors on a single chip, reducing dimensions and costs.

Yet another object of the present invention is to make it unnecessary to add a passive or active filter with the C-dump converter.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
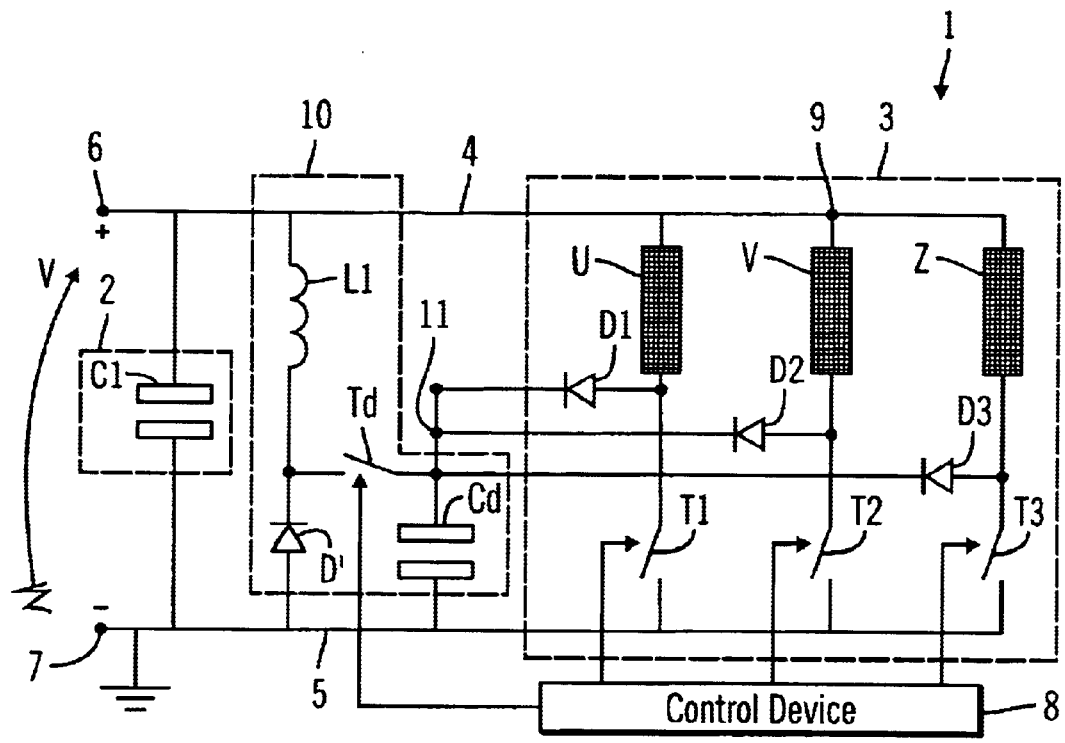
FIG. 1 shows a conventional C-dump converter.

In FIG. 1, a conventional C-dump converter 1 is shown.

Particularly, there are noted a filtering stage 2, composed by a capacitor C1, a successive conversion stage 3, an energy return stage 10, and a control device 8.

The conversion stage 3, adapted to supply the three phases of an electronically switched motor (not shown in figure), comprises a superior line 4 and an inferior line 5, that acts as ground, both connected to a couple of input terminals 6 and 7, and three paths connected in parallel, each one comprising a power switch T1, T2, and T3 and a winding U, V, and Z.

At every connection point of the power switches T1, T2, and T3 and of the three windings U, V, and Z, an anode electrode of respective demagnetization diodes D1, D2, and D3 is associated.

The power switches T1, T2, and T3 are connected at one side to the windings U, V, and Z and at the other side to the inferior line 5.

The three windings U, V, and Z are connected to a common point 9 of the superior line 4.

The series of each power switch and winding is controlled by a control device 8, adapted to receive instructions and data (not shown in figure) such as the angular position of the motor rotor.

The energy return stage 10 comprises a capacitor Cd with an electrode connected to the inferior line 5 and the other electrode connected to a chopping switch Td and the series of an inductance L1 and a diode D'.

The cathodes of the three diodes D1, D2, and D3 are connected to a connection point 11 placed between the switch Td and the capacitor Cd.

To supply one of the three windings U, V, and Z of the conversion stage 3, for example the winding U, after the supply voltage Vac has been rectified by a rectifying stage (no shown in figure) and filtered by the filtering stage 2, the switch Td is turned off, that is it is open, whereas the switch T1 is turned on, that is it is closed. The switch Td is controlled by the control block 8 according to known techniques.

In this way, the voltage V is filtered by the filtering block 2 and it is made direct so as to charge, for example, the winding U. When the winding U has to be demagnetized, the switch T1 is open and the demagnetization current is diverted to the capacitor Cd, through the demagnetization diode D1, thanks to the inversion of the polarity of the voltage present at the ends of the same windings, thereby causing a fast demagnetization.

The voltage present at the leads of the capacitor Cd is then controlled, by closing of the switch Td, at a reference value equal to about the double of the voltage present at the ends of the superior line 4 and inferior line 5.

The same description is applicable for the other windings V and Z.

It is to be noted also that the switches T1, T2, T3, and Td can be realized with a bipolar or MOSFET or IGBT technology, and particularly T1, T2, and T3 are typically placed in a configuration with the emitter electrode to ground, that is in a low side configuration, whereas Td is placed in high side configuration.

As already described, the drivers placed in high side configuration require for their working either an isolated power supply or charge pumping circuit, causing an increment of the cost and the complexity of the system, thereby preventing the integration on a single chip.

Figure 2:
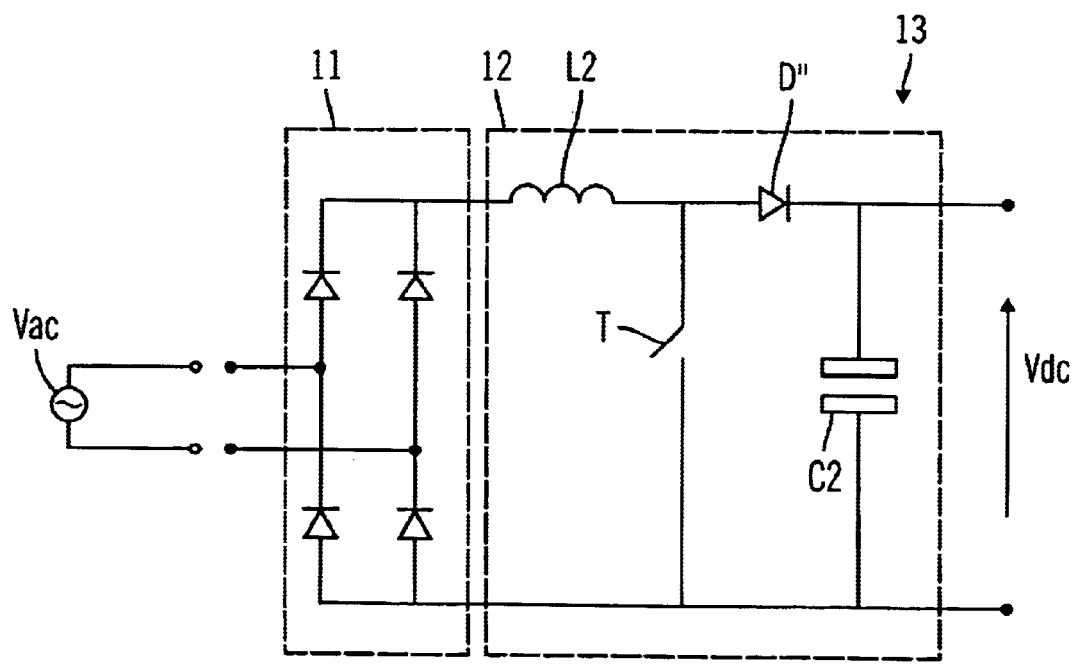
FIG. 2 shows a conventional PFC type stage.

In FIG. 2, a conventional PFC type stage 13 is shown.

The C-dump converter, shown in FIG. 1, instead of having a filtering stage 2 of passive type can have an active or PFC filtering stage, such as that shown in FIG. 2.

Such a stage has the characteristic of incrementing the form and power factor.

As shown in FIG. 2, the stage includes a generator Vac, a rectifying stage 11, and a filtering stage 12, wherein the rectifying stage 11 has the conventional structure of a four diode bridge and the filtering stage 12 is composed by an inductance L2, a capacitor C2, a switch T, and a diode D".

Therefore, the PFC stage 13 has in input an alternate line voltage Vac and it outputs a direct voltage Vdc. This happens by using both additional power semiconductor devices and passive components, incrementing the cost of the motor driving circuit.

Figure 3:
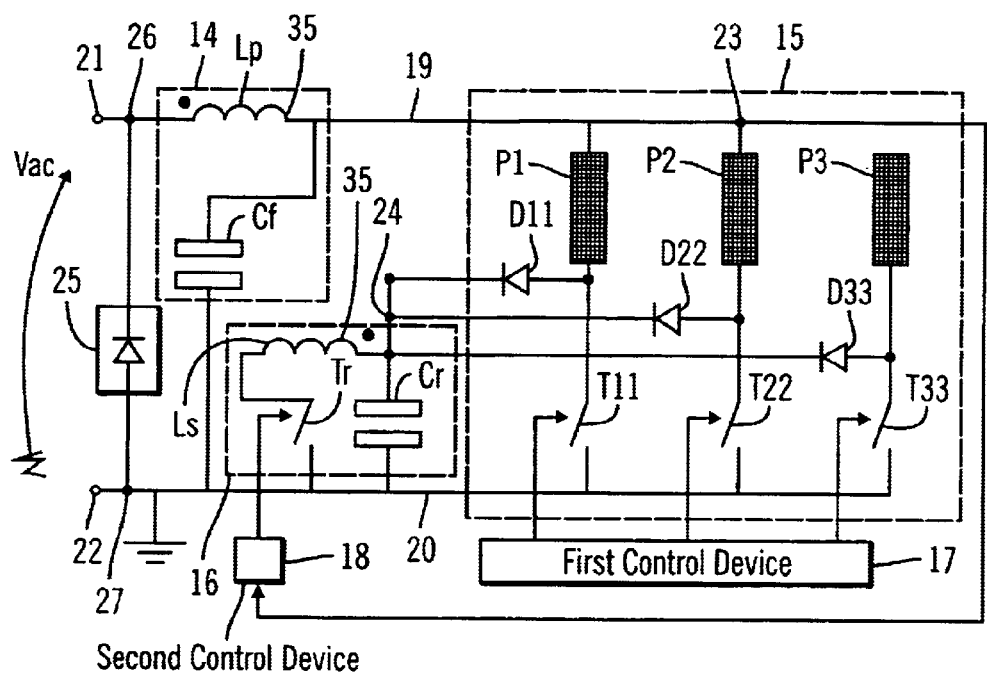
FIG. 3 shows a converter according to one embodiment of the present invention.

In FIG. 3, one possible embodiment of a converter according to the present invention is shown.

As shown in FIG. 3, the converter includes a rectifying stage 25, composed of a four diode bridge (not shown in figure), a filtering stage 14, composed of a transformer 35 comprising a primary winding Lp, and a capacitor Cf, a successive conversion stage 15, a come back energy stage 16, a first control device 17, and a second control device 18.

The conversion stage 15, adapted to supply the three phases of an electronically switched motor (not shown in figure), comprises a superior line 19 and an inferior line 20, that acts as ground, both connected to a pair of input terminals 21 and 22, and three paths connected in parallel, each one comprising a power switch T11, T22, and T33 and a winding P1, P2, and P3.

The anode electrode of respective demagnetization diodes D11, D22, and D33 is associated to each point of connection of the power switches T11, T22, and T33 and the three windings P1, P2, and P3.

The power switches T11, T22, and T33 are connected at one side to the windings P1, P2, and P3 and at the other side to the inferior line 20.

The three windings P1, P2, and P3 are connected to a common point 23 of the superior line 19.

The energy return stage 16 comprises a capacitor Cr, having an electrode connected to the inferior line 20 and the other electrode connected to a secondary winding Ls of the transformer 35, the secondary winding Ls having in series a chopping switch Tr.

The cathodes of the three demagnetization diodes D11, D22, and D33 are connected to a connection point 24 placed between the switch Td and the winding Ls.

To supply one of the three phases of the conversion stage 15, for example the winding P1, after the line voltage Vac, present between the terminals 21 and 22, has been rectified by the rectifying stage 25 and filtered by the filtering stage 14, the switch Tr is turned off, that is open, as well as the switch T11, and therefore the current flowing thorough the primary winding Lp is the current required by the DC bus and therefore the current magnetizes the winding P1 and it charges the capacitor Cr.

During the demagnetization of the winding P1 the switch Tr is closed, being controlled by the second control block 18 that controls both the voltage on Cr and the voltage on Cf, while T11 is still open so that the charge contained in Cr flows through the secondary winding Ls to the primary winding Lp in such a way as to regulate the voltage at the ends of the primary winding Lp.

Moreover the switch Tr is turned on also when the voltage on Cr exceeds a reference value equal to about two times the voltage Vdc.

This energy transfer is performed thanks to the switching of Tr at high frequency, for example at a frequency equal to about 20 KHz.

The same description is applicable for the other phases P2 and P3.

It is possible to deduce from the scheme of FIG. 3 that the circuit of the present invention needs only switches placed in low side configuration. In fact, it is to be noted that the switches T11, T22, T33, and Tr can be realized by bipolar or MOSFET or IGBT technology and preferably are all placed with the emitter electrode at ground, that is in low side configuration.

This characteristic allows realization of semiconductor devices of a unique typology, thereby allowing the easy integration of the converter of the present invention into a single chip.

It is possible to deduce from the scheme of FIG. 3 that the circuit of the present invention comprises the functional characteristics of a PFC stage, shown in FIG. 2, but not the circuit elements. In fact, such functional characteristics are obtained by replacement of the filtering stage 12 of the PFC with the filtering stage 14.

Particularly, the control blocks 17 and 18 can be implemented into a unique control block (not shown in figure) so as to further help the integration into a single chip.

Particularly, the transformer 35 is a high frequency transformer of Np:Ns HF type, in which Np shows the number of spires on the primary winding Lp and Ns shows the number of spires on the secondary winding Ls.

Such a transformer is the easiest and best solution for inductive coupling. in fact by looking after choosing a particular ratio of spires, for example 1:1, the dimension of the magnetic structure is reduced and the coupling is optimized thereby limiting the parasitic inductive effects.

Figure 4:
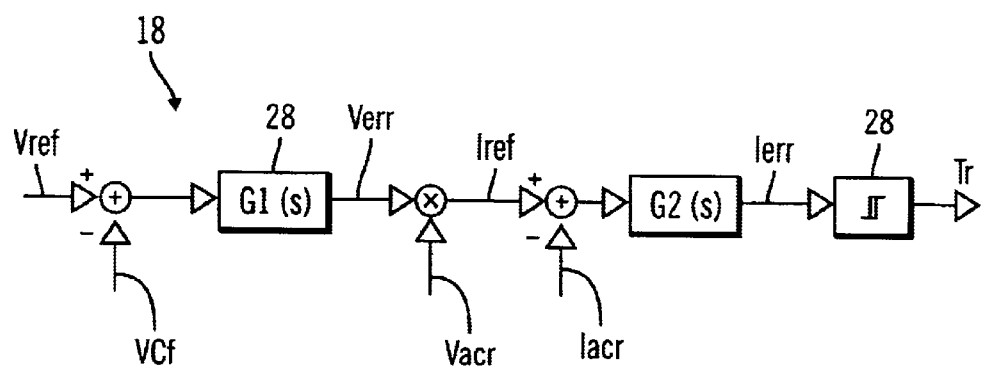
FIG. 4 shows in greater detail a device of FIG. 3.

In FIG. 4, the control block 18 is shown in greater detail.

The control for the switch Tr is provided by a sequence of operations by means of which the voltage present between the armature of the capacitor Cr is subtracted from a reference voltage Vref, proportional to about two times of the rectified voltage present between the terminals 27 and 28 of FIG. 3, that is two times the voltage Vdc. The voltage in this way generated is filtered by a first transfer function G1(s) so as to provide an error voltage Verr.

The voltage Verr is multiplied for the rectified voltage present to the terminals 27 and 28 so as to provide a reference current Iref. From this current Iref, the rectified current that flows at the output of the diode bridge 25 is subtracted. In this way, the effect of a PFC stage is implemented because a current having a different module but equal phase is deduced from a voltage.

The current thus provided is filtered by means of a second function G2(s) so as to provide an error current Ierr.

The current Ierr is used by an hysteresis block 28, known per se, so as to provide the opening and closing controls for the switch Tr.

It is possible to use, instead of a hysteresis block 28, a PWM block (Pulse Width Modulation), known per se, that compares the current Ierr with a reference signal, for example a sawtooth signal (not shown in figure), so as to provide the opening and closing controls for the switch Tr.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A driving circuit for an electronically switched motor, said driving circuit comprising:

a supply voltage rectifying stage for providing a rectified supply voltage;

first and second control blocks;

first switching means for switching state based on at least one output signal of the first control block;

magnetic means for providing a magnetic flux according to the state of the first switching means;

a plurality of transmission diodes for transmitting an exciting current that flows through the magnetic means;

first energy storing means for storing the exciting current flowing through the plurality of diodes;

an energy return stage for transferring the energy stored in the first energy storing means to the rectifying stage;

second switching means controlled by an output signal of the second control block;

first energetic conversion means coupled to the first energy storing means for receiving the energy stored in the first energy storing means by means of the second switching means; and second energetic conversion means coupled between the rectifying stage and the magnetic means, the second energetic conversion means being energetically coupled with the first energetic conversion means.

2. The driving circuit according to claim 1, wherein the second switching means is in series with at least one of the first and second energetic conversion means.

3. The driving circuit according to claim 1, wherein the first switching means and the second switching means are in low side configuration.

4. The driving circuit according to claim 1, wherein the second control block provides the output signal that controls the second switching means according to a pulse width modulation driving technique.

5. The driving circuit according to claim 1, wherein the first switching means and the second switching means are formed by bipolar transistors each having its emitter electrode connected to ground.

6. The driving circuit according to claim 1, wherein the first switching means and the second switching means are formed by MOSFET transistors each having its source electrode connected to ground.

7. The driving circuit according to claim 1, wherein the first switching means and the second switching means are formed by IGBT transistors each having its source electrode connected to ground.

8. The driving circuit according to claim 1, wherein the first and second control blocks are integrated into a unique control block.

9. The driving circuit according to claim 1, wherein the output signal of the second control block has a frequency such that a substantially sinusoidal current flows through the second energetic conversion means.

10. A driving circuit for an electronically switched motor, said driving circuit comprising:

a supply voltage rectifying stage for providing a rectified supply voltage;

first and second control blocks;

first switching means for switching state based on at least one output signal of the first control block;

magnetic means for providing a magnetic flux according to the state of the first switching means;

a plurality of transmission diodes for transmitting an exciting current that flows through the magnetic means;

first energy storing means for storing the exciting current flowing through the plurality of diodes;

an energy return stage for transferring the energy stored in the first energy storing means to the rectifying stage;

second switching means control led by an output signal of the second control block: and energetic conversion means for receiving the energy stored in the first energy storing means through the second switching means that is controlled by the output of the second control block, so as to provide a current as sinusoidal as possible, wherein the energetic conversion means includes a transformer comprising a primary winding and a second winding and having a predetermined spire ratio.

11. The driving circuit according to claim 10, wherein the primary winding and the second winding are energetically coupled, and one of the primary winding and the secondary winding is coupled between the rectifying stage and the magnetic means.

12. A driving circuit for an electronically switched motor, said driving circuit comprising:

a supply voltage rectifying stage for providing a rectified supply voltage;

first and second control blocks;

first switching means for switching state based on at least one output signal of the first control block;

magnetic means for providing a magnetic flux according to the state of the first switching means;

a plurality of transmission diodes for transmitting an exciting current that flows through the magnetic means;

first energy storing means for storing the exciting current flowing through the plurality of diodes;

an energy return stage for transferring the energy stored in the first energy storing means to the rectifying stage;

second switching means controlled by an output signal of the second control block; and energetic conversion means for receiving the energy stored in the first energy storing means through the second switching means that is controlled by the output of the second control block, so as to provide a current as sinusoidal as possible, wherein the second control block provides the output signal that controls the second switching means according to a hysteresis driving technique.

13. An electronically switched motor including a driving circuit, said driving circuit comprising:

a supply voltage rectifying stage for providing a rectified supply voltage;

first and second control blocks;

first switching means for switching state based on at least one output signal of the first control block;

magnetic means for providing a magnetic flux according to the state of the first switching means;

a plurality of transmission diodes for transmitting an exciting current that flows through the magnetic means;

first energy storing means for storing the exciting current flowing through the plurality of diodes;

an energy return stage for transferring the energy stored in the first energy storing means to the rectifying stage;

second switching means controlled by an output signal of the second control block;

first energetic conversion means coupled to the first energy storing means for receiving the energy stored in the first energy storing means by means of the second switching means; and second energetic conversion means coupled between the rectifying stage and the magnetic means, the second energetic conversion means being energetically coupled with the first energetic conversion means.

14. The motor according to claim 13, wherein the first energetic conversion means includes one of a primary winding and a second winding of a high frequency transformer and the second energetic conversion means includes the other of the primary winding and the second winding.

15. The motor according to claim 13, wherein the second switching means is in series with at least one of the first and second energetic conversion means.

16. The motor according to claim 13, wherein the first switching means and the second switching means are in low side configuration.

17. The motor according to claim 13, wherein the second control block provides the output signal that controls the second switching means according to a pulse width modulation driving technique.

18. The motor according to claim 13, wherein the second control block provides the output signal that controls the second switching means according to a hysteresis driving technique.

19. The motor according to claim 13, wherein the first switching means and the second switching means are formed by bipolar transistors each having its emitter electrode connected to ground.

20. The motor according to claim 13, wherein the first switching means and the second switching means are formed by MOSFET transistors each having its source electrode connected to ground.

21. The motor according to claim 13, wherein the first switching means and the second switching means are formed by IGBT transistors each having its source electrode connected to ground.

22. The motor according to claim 13, wherein the first and second control blocks are integrated into a unique control block.

23. The motor according to claim 13, wherein the output signal of the second control block has a frequency such that a substantially sinusoidal current flows through the second energetic conversion means.

* * * * *